United States Patent [19]

Fisher et al.

[11] Patent Number: 4,946,258

[45] Date of Patent: Aug. 7, 1990

[54] HOLOGRAPHIC EXPOSURE STATION AND FILM TRANSPORT

[76] Inventors: Gary R. Fisher, 2251 Federal Ave., Los Angeles, Calif. 90064; Ole Gunst, 19475 Grand View Dr., Topanga, Calif. 90290

[21] Appl. No.: 378,699

[22] Filed: Jul. 11, 1989

[51] Int. Cl.$^5$ .................. G03B 1/52; G03H 1/26
[52] U.S. Cl. .................. 350/321; 350/3.76; 352/222
[58] Field of Search .................. 350/3.75, 3.76, 3.79, 350/321; 352/191, 192, 193, 194, 195, 196; 355/222, 73

[56] References Cited

U.S. PATENT DOCUMENTS

| | | | |
|---|---|---|---|
| 3,587,960 | 6/1971 | Gerb | 352/194 |
| 4,411,489 | 10/1983 | McGrew | 350/3.76 |
| 4,411,503 | 10/1983 | Bailey et al. | 352/222 |

FOREIGN PATENT DOCUMENTS

50-99320  2/1977  Japan .................. 350/3.79

Primary Examiner—Bruce Y. Arnold
Assistant Examiner—J. Ryan
Attorney, Agent, or Firm—Henry M. Bissell

[57] ABSTRACT

An exposure station and a film transport comprise apparatus for recording a series of strip holograms on a continuous length of non-perforated film. The apparatus includes a vacuum-platen for keeping the film stable during holographic recording and a film stepping mechanism for advancing the film in equal steps between successive exposures. The film stepping mechanism is operationally coupled to the vacuum-platen and includes a drive arm that grips the film during each advance and releases the film without backlash between successive film advances. The film stepping mechanism includes a single-acting vacuum cylinder for moving the drive arm. The apparatus does not introduce strain in the film during the transport process which could result in non-uniform demodulation of the successive strip holograms. The stepping increment (holographic strip width) is adjustable with accurate increments as small as 0.005" being obtainable. In the preferred embodiment, both film stepping mechanism and vacuum-platen assembly are driven by a single vacuum system. In another embodiment the film stepping mechanism includes a double-acting cylinder for moving the drive arm which can be activated by either fluid pressure or vacuum.

47 Claims, 10 Drawing Sheets

HOLOGRAPHIC EXPOSURE STATION AND FILM TRANSPORT

BACKGROUND OF THE INVENTION

1. Field of the Invention

This invention relates to the field of optical holography and, more specifically, to an apparatus for providing a stable exposure station and mechanism for transporting non-perforated film in uniform steps without backlash and without inducing film strain for use in the making of integral holograms.

2. Description of the Related Art

Methods of making holographic stereograms are well known in the holographic art. Generally speaking, such stereograms are synthesized from a series of two dimensional transparencies, each transparency corresponding to a differing viewpoint of a subject. During reconstruction, the resulting composite hologram gives a three dimensional representation of the subject, which depending on the method of manufacture, is viewable with either laser or white light illumination, and may provide either full parallax or horizontal-only parallax.

A survey of various type of holographic stereograms is given in Benton, S, "Survey of Holographic Stereograms," in *Processing and Display of Three-Dimensional Data. SPIE* 367:15 (1983).

Cylindrical rainbow holographic stereograms, viewable in white light, were invented by Lloyd Cross in 1973 and are known in the literature as Cross-type or multiplex holograms. Several improvements of the original Cross-type hologram have been reported in the literature. These include methods for reducing distortion in the holograms, various alternative optical systems for circumventing the cumbersome liquid-filled optics of the original design, and methods to attain flat playback without distortion.

The multiplex hologram is formed by sequentially recording a number of vertically oriented strip holograms laid side-by-side on a photosensitive emulsion. In its original form the multiplex hologram was recorded on a 120-degree section of a 16" diameter cylinder. Holographic film was taped to a 120-degree section of a plastic cylinder with the concave surface of the section facing the optical system of the apparatus. The section was then mounted on a rotary platform with indexable motor means. By indexing the motor means in uniform steps, a sequence of strip holograms were then recorded. An advantage of the approach was that film was kept relatively stable during the holographic exposures and was not subjected to strain. A disadvantage of the approach was that in order to construct a full 360-degree hologram of the subject, three individual 120-degree multiplex holograms had to be constructed and spliced together to form the 360-degree composite hologram. Alignment of the edges of the three holograms was critical, and if not properly done, resulted in double images at the splices. From an aesthetic point of view, the splices were visually distracting even if the problem of the double images was eliminated. Later efforts have centered on methods of recording both 360-degree format and flat format multiplex holograms on a single length of film.

For purposes of the present invention and to avoid confusion with the various terms employed in the literature, the term "integral hologram" shall be used to refer to a transmission-type white-light viewable multiplex holographic stereogram composed of a plurality of vertically-oriented strip holograms recorded sequentially on a continuous length of film.

Integral holograms are all made utilizing a step-and-repeat process. The process generally comprises the steps or exposing a strip hologram, advancing the holographic film for the next recording, advancing the transparency-film transport, and waiting for a predetermined stabilization interval before repeating the process. As many as 2100 strip holograms are recorded in making a 360-degree integral hologram.

The film used until recently for making this type or integral hologram, Kodak SO-173, was stocked in 9½" widths and available in other widths by special order. Currently the film preferred by the inventors is Agfa 8E75HD which is available in 10" widths and is non-perforated. The difficulty of stabilizing such large format film during strip recording of an integral hologram and not subjecting it to strain can be appreciated by reference to early papers in the literature that suggested stabilization times averaging 15 minutes before recording a single unitary hologram on a Kodak 649-F plate.

Since each strip hologram in the integral hologram is viewed in reconstruction in relation to its strip-neighbor, the percent modulation of each strip hologram should ideally be equal. Deviation from uniform modulation results in a "picket-fence" effect in the final hologram which is visually distracting.

In order to eliminate variations in modulation in an otherwise stable holographic system, the present invention has been developed to minimize strain on the film during the transport and recording process and to provide a stable exposure station so as to require a minimum stabilization time between recording of the strip holograms.

To the inventors' knowledge, prior art exposure stages and film transports for integral holographic applications have employed drive rollers in various configurations to move the film during the interval between the recording of each successive strip hologram. In such devices, if drive rollers are fixed relative to the holographic film and driven independently of means to drive the supply and take-up reels, any slight misalignment of the drive rollers relative to the vertical plane of the film will cause the film to move vertically as it is advanced. Owing to the resistance the drive rollers exert on the film, the film will eventually bind in the film guides.

A more complicated drive roller assembly could obviate this problem by retracting from the film after each strip hologram is recorded. However, such retraction could allow the film to readjust its position in the absence of drive roller friction thus causing unpredictably un-equal strip widths to be recorded.

In U.S. Pat. No. 4,411,489 a film exposure stage and film transport is disclosed consisting of a supply roller, a take-up roller, and a rotatable cylindrical platen. As stated in the disclosure, the take-up roller and platen are driven by a conventional drive system. Although not indicated, supply and take-up rollers would require tensioning means to maintain the film against the cylindrical platen which could induce strain in the film during the recording process.

Amesbury reports a precision film transport for incremental or continuous transport of large format film past a film gate for use in a laser scanning system, [Amesbury, M., "Large Format Film Transport" in *Data Extraction and Classification from Film. SPIE* 117:103

(1977) p 103.]. The transport is capable of incremental steps from 0.01" to 10" and relies on a servo controlled tensioning system for transport of the film. This approach, while appropriate for the intended use, would be counter-indicated in a holographic transport due to the strain the tensioning system would impart to the film.

The present invention provides a viable alternative to the prior art which is not subject to the disadvantages of the different systems noted above. Rather than employing drive rollers to move the holographic film, a step-and-repeat mechanism is disclosed which incorporates a drive device to advance the holographic film. The drive device of the present invention yields repeatably spaced strip holograms even for strip widths of the order of 0.005".

The drive device coupled to an anti-rise device in the present invention compensates for any slight tendency for the film to rise during film movement between successive recording of the strip holograms. The drive device exerts minimal force on the bottom edge of the film and thereby minimizes strain on the holographic film.

In one embodiment, the drive device is vacuum driven by piston-cylinder means. A vacuum-platen exposure stage is provided which keeps the film stable during exposure. The vacuum-platen is operationally coupled to the drive device which allows the device to release the film between successive film advances without the backlash and concomitant wear associated with the use of motors, bearings, and the like. Advantageously, a single vacuum system activates both the drive device and the vacuum-platen.

The width of each strip hologram in a given integral hologram is accurately adjustable by a micrometer which varies the stroke of the piston advance mechanism.

Rather than employing supply and take-up reels with drive motors, the present invention employs passive drums to contain the film at the supply and take-up side of the transport. Advantageously, this allows a length of integral hologram to be recorded which is at least twice the length currently made, without requiring additional, stress inducing, coupled supply and take-up drive motors.

SUMMARY OF THE INVENTION

The invention provides an exposure stage and film transport for use in making integral holograms.

In the first embodiment of the invention a vacuum platen assembly and film stepping mechanism are disclosed which are applicable in the recording of a sequential plurality of strip holograms of equal width on a continuous length of non-perforated film. The apparatus includes a vacuum platen assembly for keeping the film stable during holographic recording and a film stepping mechanism for advancing the film in equally spaced steps between successive exposures. The film stepping mechanism is operationally coupled to the vacuum platen and includes a drive arm that grips the film during each advance and releases the film without backlash between successive film advances. The film stepping mechanism includes a single-acting vacuum cylinder to move the drive arm. Importantly, the apparatus does not introduce strain in the film during the transport process which could result in non-uniform demodulation of the successive strip holograms. The stepping increment (holographic strip width) is adjustable with accurate increments as small as 0.005" being obtainable. In the first embodiment, both the film stepping mechanism and the vacuum platen assembly are advantageously operated by a single vacuum system.

In the second embodiment a double-acting piston-cylinder assembly is disclosed for moving the drive arm in the film stepping mechanism by either fluid pressure or vacuum.

BRIEF DESCRIPTION OF THE DRAWINGS

A better understanding of the present invention may be realized from a consideration of the following detailed description, taken in conjunction with the accompanying drawing in which.

DESCRIPTION OF THE PREFERRED EMBODIMENTS

Figure 1:
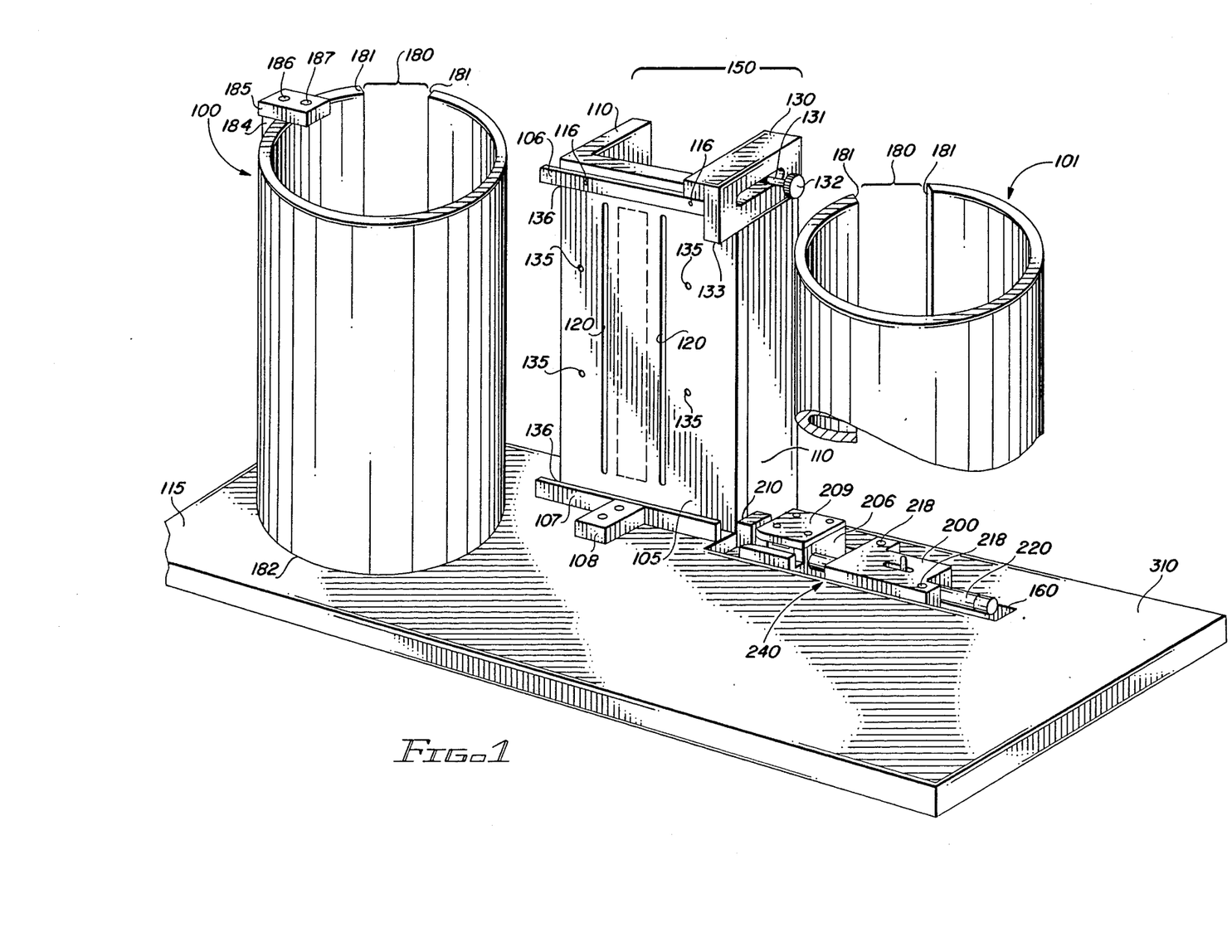
FIG. 1 is a front perspective view of the holographic exposure station and film transport showing supply and take-up drums, vacuum-platen assembly, and film stepping mechanism.

FIG. 1 shows a front perspective view of the holographic exposure station and film transport assembly. The assembly consists of base plate 115, vacuum-platen assembly 150, supply drum 100, take-up drum 101, and film stepping mechanism 240. In the descriptions to follow, the term "transport" will be used to describe the collective apparatus in FIG. 1.

Film 300 rides on surface 310 of base plate 115. The surface of the base plate should not vary more than 0.0005" in flatness over its entire surface. Base plate 115 is preferably 1" thick aluminum tooling plate which has been dial indicated over its surface to insure flatness prior to machining operations. After machining, the surface 310 of base plate 115 is preferably lapped and subsequently hard black anodized to reduce surface reflectivity.

Figure 2:
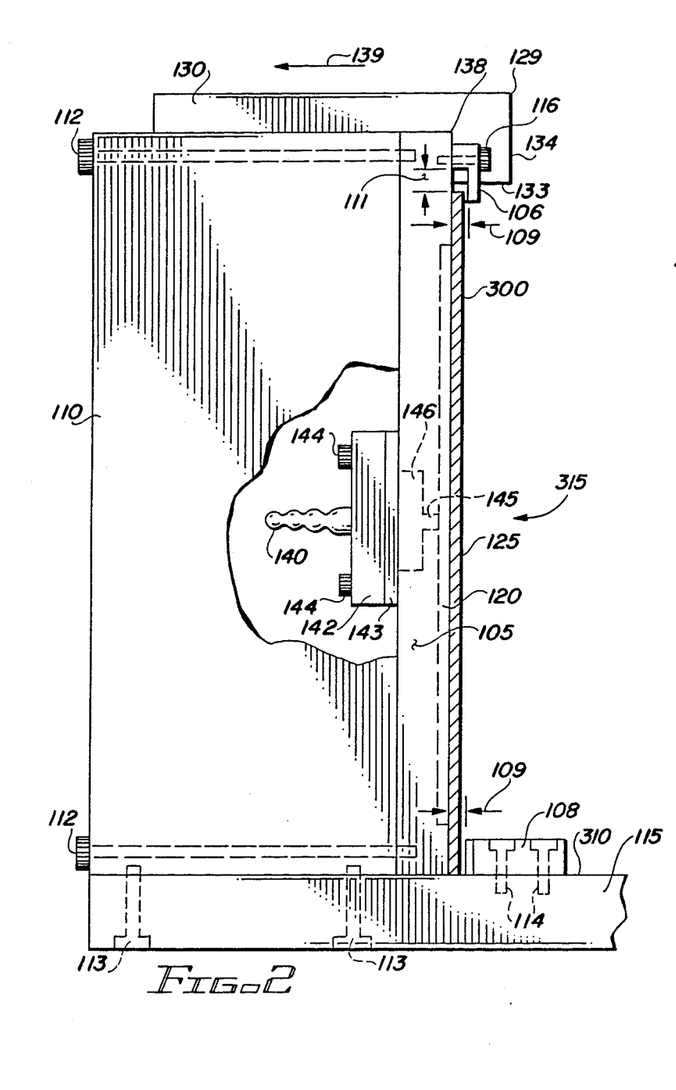
FIG. 2 is a side elevation of the vacuum-platen assembly as seen from the supply drum side of FIG. 1.

FIG. 2 shows a side elevation of the vacuum-platen assembly. By reference to FIGS. 1 and 2, the vacuum-platen assembly 150 principally consists of vacuum-platen 105, vertical platen supports 110, top film guide 106, bottom film guide 107, anti-rise block 130, anti-rise screw 132, vacuum feed-through plate 142, gasket 143, and vacuum-ferrule 140.

Vacuum-platen 105 is attached with screws 112 to vertical platen supports 110 which are in turn attached to base plate 115 by screws 113. Vacuum-platen 105 is preferably ¼" thick cold rolled steel, surface ground on the face shown in FIG. 1. To reduce reflectivity, the surface of 115 is preferably nickel plated with a flat black chrome over-plating.

Top film-guide 106 is mounted to vacuum-platen 105 with two mounting screws 116. Bottom film-guide 107 is mounted to film-guide support 108 which in turn is mounted to base plate 115. By reference to FIG. 2, the top and bottom film guides in opposition to the front face of platen 105 define upper and lower channels 109 to contain the top and bottom segments of holographic film 300. The width of each channel should be chosen to keep the film in substantial proximity to the platen, while not introducing resistance to film movement. In practice the channels should typically be 0.003" to 0.005" wider than the thickness of the film to be transported, and of equal width.

The vertical distance between the top and bottom film guides 106, 107 is chosen to accommodate a specific width of holographic film. As shown in FIG. 2, the bottom of the film rests on the top surface 310 of the base plate 115. For purposes to be described later, the top film-guide is located so that a gap 111 exists between the top of the film and the upper surface of the top film-guide. In practice this gap should be of the order of 0.30".

To accommodate a plurality of film widths, tapped holes 135 are provided as shown in FIG. 1 to enable the top film-guide 106 to be positioned for other pre-specified film widths. By reference to FIG. 1, bottom film-guide 107 and top film-guide 106 extend beyond the edge 136 of vacuum-platen 105. The extensions should typically be of the order of 0.5". These extensions facilitate feeding film into channels 109 during loading operations. To prevent the film from scratching, the edge of the top and bottom film-guide is preferably chamfered. Top film-guide 106 and bottom film-guide 107 are preferably made of non-hardened tool steel. Both guides are preferably hard chrome plated.

Vacuum-platen 105 has two vacuum-recesses 120 located on either side of the holographic exposure station 125 (shown a dotted rectangle on FIG. 1). For integral holography applications, the separation of the vacuum-recesses should be of the order or 1.0". This will accommodate object beam 315 widths at the exposure station 125 of up to 0.8" without introducing noticeable holographic demodulation due to local deformation of the film are each vacuum-recess when vacuum is applied.

Each vacuum-recess is preferably of the order of 0.035" wide. By reference to FIG. 2, bored holes 145 communicate with each vacuum-recess 120 and with bored recess 146. Vacuum feed-through plate 142 with threaded vacuum ferrule 140 is mounted to the rear of the vacuum-platen with screws 144. Gasket 143 between vacuum feed-through plate 142 and platen 105 maintains vacuum integrity.

The film supply drum 100 and film take-up drum 101 will now be described: Typically, the vast majority of integral holograms do not exceed six feet in length. Since the overall length of film in the holographic application is relatively short (less than 20 feet) by conventional motion picture standards, the film transport of this invention does not require supply and take-up mechanisms as are employed in conventional large format motion picture film transports. Paradoxically, such mechanisms could quite likely introduce strains in the film which would result in unwanted demodulation in the strip holograms, but could be employed if the film transport of this invention were to be used with other media.

In the present invention the supply and take-up function is handled by passive drums. Drums 100, 101 are preferably plexiglass extruded cylinders with wall thickness of ¼" or greater to reduce their resonant frequency. Plexiglass is chosen over aluminum or steel extrusions owing to the surface finish on the interior wall of the extrusion.

With reference to FIG. 1, vertical slot 180 is cut from each drum to serve as an opening for passing the film. Edges 181 of drums 100 and 101 are chamfered and polished to avoid scratching the film. The base 182 of each drum is cut perpendicular to the drum axis. To eliminate light transmission through the plexiglass extrusion, the outer surface of each drum is preferably treated with a low reflectivity black paint such as Krylon Corporation Ultra-Flat Black.

Supply drum 100 and take-up drum 101 are secured to the surface of base plate 115 by clamping means consisting of clamp-rod 184, clamp 185 and clamp screw 186. To simplify the drawing, FIG. 1 shows only one clamping means associated with supply drum 100. While not shown in the drawing, three identical clamping means, each separated by approximately 80 degrees, are preferred for each drum.

For a given drum diameter, clamp-rod 184 is located on base plate 115 such that the outer diameter of the clamp-rod contacts the surface of each drum as illustrated in FIG. 1. Clamp-rod 184 is secured to base plate 115 by screw means. Clamp 185 is attached to the top of clamp-rod 184 by screw means 186, and clamp screw 187 is tightened against the upper annular surface of the drum to secure the drum to the base plate.

On the supply side of the transport, holographic film is loosely coiled into supply drum 100. On the take-up side, film advanced through vacuum-platen assembly 150 and film stepping mechanism 240 is allowed to freely coil into take-up drum 101 along its natural curve. The film in both 100 and 101 is free standing in the vertical plane of the transport and remains in an essentially vertical orientation owing to the natural stiffness of the film substrate. Drums 100 and 101 serve simply to contain the film and prevent fogging from stray light during the recording of the integral hologram.

The holographic film stepping mechanism will now be described: The film stepping mechanism 240 is shown in FIG. embedded into milled recess 160 of base plate 115. Mounting screws 218 mate with tapped holes in base plate 115 and serve to rigidly attach the film stepping mechanism to the base plate.

In the preferred embodiment, the film stepping mechanism is operated by vacuum. Advantageously this allows a single vacuum system to operate both the vacuum-platen and the film stepping mechanism, and takes advantage of the operative coupling of the vacuum-platen and film stepping mechanism in the film stepping process.

Figure 3:
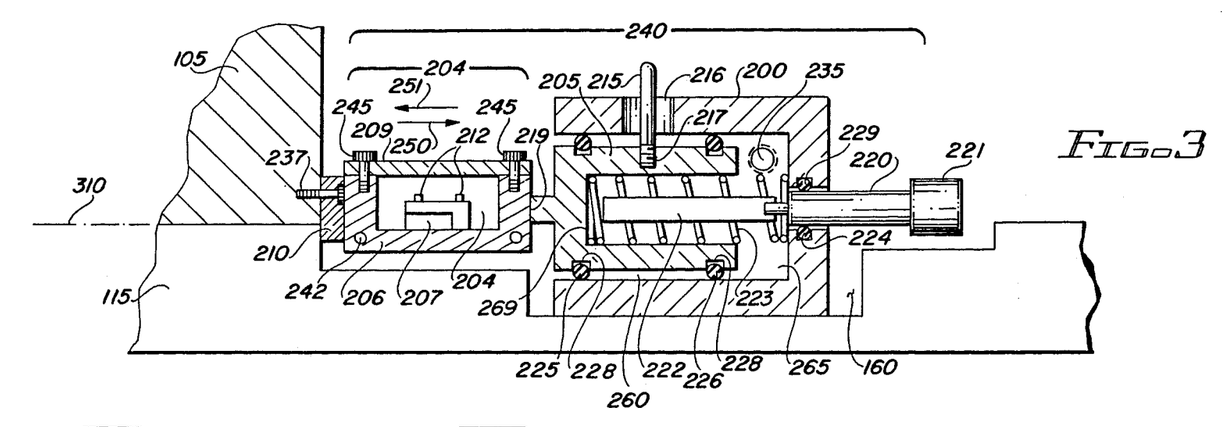
FIG. 3 is a front sectional view of the film stepping mechanism showing the drive block assembly coupled to the first embodiment of the piston-cylinder assembly.
Figure 4:
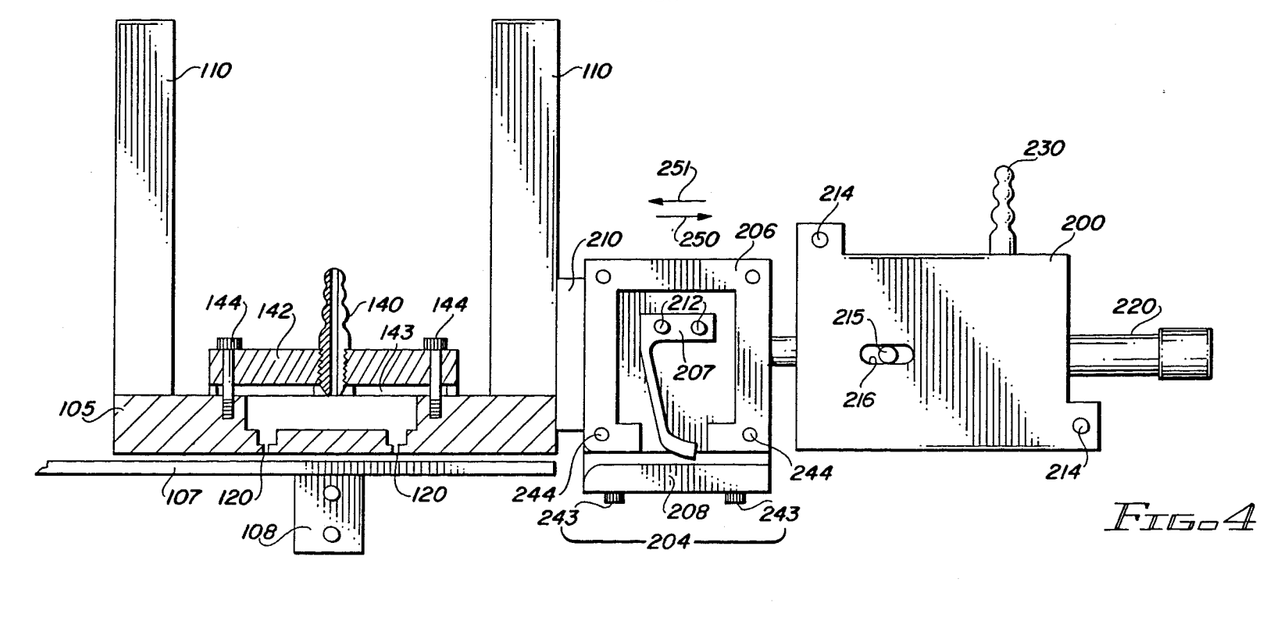
FIG. 4 is a top view of the vacuum-platen assembly and film stepping mechanism with the vacuum-platen assembly in partial section.

Details of the film stepping mechanism are best understood by reference to FIG. 3 and FIG. 4. The film stepping mechanism 240 consists of cylinder 200, piston 205, anti-rotation key 215, O-rings 225 and 226, micrometer 220, spring 223, stop-rod 222, and drive block assembly 204. Cylinder 200 has bored hole 260 to receive piston 205. Piston 205 has two O-ring grooves 228 and is counter-bored as shown. Front O-ring 225 and rear O-ring 226 insure that the travel of the piston is parallel to the surface of base plate 115. Since the piston is to operate under a vacuum environment, it is essential that the "fit" of O-rings 225 and 226 be sufficient to insure a seal, while not introducing appreciable resistance to piston movement. Cylinder 200 has tapped port 235 to receive vacuum ferrule 230 (FIG. 4). The cylinder is bored to receive a standard micrometer 220 and has O-ring groove 229 for receiving O-ring 224. A micrometer with a travel of 0–0.5" and with vernier graduations of 0.001" is appropriate for integral holography applications.

Anti-rotation key slot 216 is milled into the cylinder between O-ring grooves 228,228. Key slot 216 accepts anti-rotation key 215 which is screwed to piston 205 as shown. The anti-rotation key prevents rotation of the piston and drive block 206 during piston movement. The width of the anti-rotation key slot should be sufficiently wider than the diameter of key 215 to minimize friction during piston travel, but not so wide as to allow appreciable rotation of the piston. The width of the anti-rotation key slot 216 is preferably of the order of 0.005" greater than the diameter of key 215. Preferably, cylinder 200 and piston 205 are machined from 7750 aluminum.

By reference to FIG. 3, O-ring 224 is captured in O-ring groove 229 and micrometer 220 is press-fit into cylinder 200. Although not shown in FIG. 3, a set screw is employed to lock the micrometer barrel into cylinder 200, thus eliminating the possibility of partial micrometer retraction during repeated operation of the film stepping mechanism. Micrometer 220 is provided with stop-rod 222. Stop-rod 222 is preferably machined from 303 stainless steel. Stop-rod 222 is press fit on the micrometer shaft and secured with an industrial thread tightener (such as Locktite Corporation 242 Threadlocker). Piston return-spring 223 is contained in the annular region between the piston counter bore and stop-rod 222. The cylinder volume 265 subjectable to vacuum is defined by the clear region in FIG. 3 from rear O-ring 226 to the rear bored surface of cylinder 200.

As shown in FIG. 3, piston 205 is rigidly coupled to drive block 206, and stop-block 210 is attached to vacuum-platen 105 with flat head screw 237. In order to reduce vibration from being transmitted from the film stepping assembly 240 to the vacuum-platen 105, the stop-block is preferably made from a plastic such as Delrin. Applying vacuum at 235 via vacuum-ferrule 230 causes piston 205 to retract in direction 250 until stop-rod 222 contacts surface 269 in piston 205. The distance the piston can travel is adjustable by turning micrometer adjustment knob 221. By subsequent venting of 230 to the atmosphere, spring 223 drives piston 205 in direction 251 until drive block 206 contacts stop-block 210.

The drive block assembly 204 will now be described with reference to FIGS. 3–7: The drive block assembly comprises drive block 206, drive arm 207, film contacting plate 208, and drive block top-plate 209. Drive arm 207 is screwed to drive block 206 with drive arm screws 212. The film contacting plate 208 is screwed to drive block 206 with screws 243. Drive block top-plate 209 is screwed to drive block 206 with screws 245.

Figure 5:
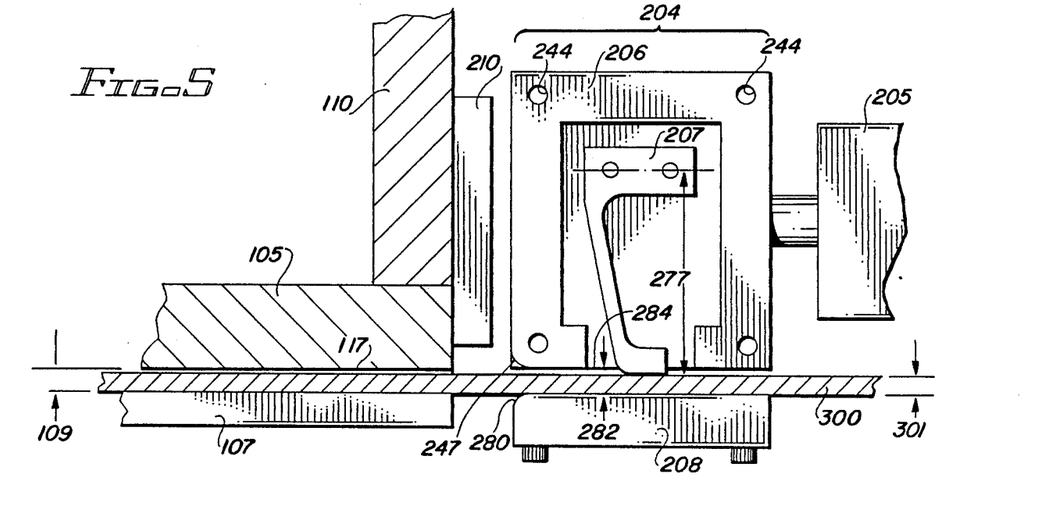
FIG. 5 is a detailed top view of the drive block assembly with the top plate removed, and the film guide channel of the vacuum-platen in FIG. 4.

Referring to FIG. 5, the leading edge 247 of drive block 206 and the leading edge 280 of film contacting plate 208 are chamfered as shown. Drive block assembly 204 is aligned relative to vacuum-platen 105 such that plane 117 of the front surface of 105 is coincident with plane 284 of the front surface of drive block 206. The front edge of drive block top-plate 209 is coincident with plane 284 of drive block 206 and is chamfered identically to edge 247 of drive block 206. This defines a channel 282 in which the lower portion of film 300 is contained.

Figure 6:
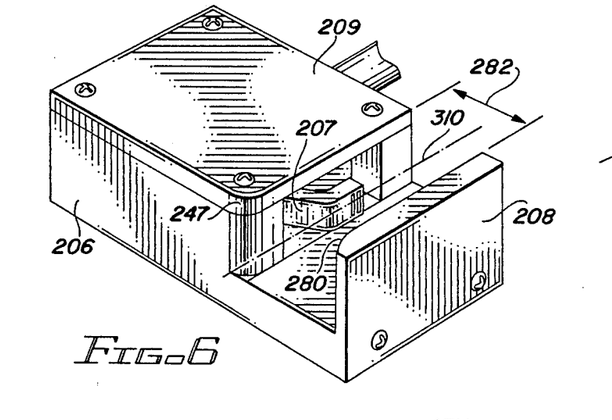
FIG. 6 is a front perspective view of the drive block assembly corresponding to FIG. 4, with the film channel shown in exaggerated width perspective.

FIG. 6 shows a front perspective view of the drive block assembly, with channel 282 exaggerated in width. The figure illustrates the attachment of film contacting plate 208 to drive block 206, the attachment of drive block top-plate 209 to drive block 206, and the channel 282 that results.

Referring again to FIG. 5, the relative alignment of 117 and 284 in conjunction with chamfered edges 247 and 280 insures that, during film loading, the leading edge of film 300 will enter the drive block assembly channel 282 without binding.

The width of channel 282 between drive block 206 and film contacting plate 208 is identical to the width of channel 109 (defined by the gap between vacuum-platen 105 and film guides 107,106). As was described earlier, the width of channel 109 is preferably 0.003"–0.005" greater than the thickness 301 of film 300 to be transported.

Referring to FIG. 2, the bottom edge of film 300 rides on the top surface 315 of base plate 115. By reference to FIG. 3 and FIG. 6, the film stepping mechanism 240 is embedded in base plate 115 to a depth sufficient for the bottom edge of the film to ride slightly above the bottom edge of drive arm 207. This is illustrated by dotted line 310 in FIG. 6. Drive arm 207 is designed to securely grip the film when drive block 206 moves in direction 250, and release the film when drive block 206 moves in direction 251.

In brief, incremental movement of holographic film is accomplished by the operative coupling between vacuum-platen 105, cylinder 200, and drive block assembly 204. With film engaged by drive arm 207 as shown in FIG. 5 and by further reference to FIGS. 3–4, advancing film 300 in direction 250 is established by first venting vacuum-platen ferrule 140 to the atmosphere and then applying vacuum to film stepping vacuum ferrule 230. This causes drive arm 207 to move the film in direction 250 until surface 269 of piston 205 contacts stop-rod 222. To prepare for the next incremental film advance, vacuum is first applied to vacuum-platen ferrule 140, followed by venting vacuum ferrule 230 to the atmosphere. Since film 300 is held rigidly at vacuum-recesses 120, drive arm 207 releases the film while piston return-spring 223 returns drive block 206 to stop-block 210.

Figure 7:
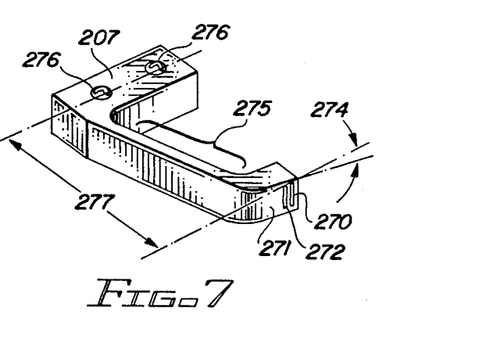
FIG. 7 is a front perspective view of the drive arm.

By reference to FIG. 7, foot 271 of drive arm 207 has several parallel scored indentations 272 to provide "gripping sites" at the film contacting area 270. The contact area is minimized by providing a slight angular offset 274 of the foot relative to the vertical plane of the film. This offset serves to reduce friction of the drive arm against the film as drive block 206 is retracted to stop-block 210 prior to the next film advance. Preferably, the offset angle is of the order of 2–3 degrees.

Region 275 of drive arm 207 acts as an equivalent spring. Region 275 must be stiff enough so that the drive arm, during film advance, will provide consistent incremental steps for strip hologram widths as small as 0.005". The length 277 of drive arm 207, consistent with a given stiffness in region 275, determines the static force that the drive arm exerts on film 300 against film contacting plate 208. If the static force is not enough to overcome the resistance of the film in the transport, drive arm 207 will slip during film advance. If the force exerted by the drive arm is greater than that required to overcome the compressive energy of piston return-spring 223 (FIG. 3), the drive arm will fail to release the film as required to prepare for the next incremental film advance. Since the force available to drive piston 205 (FIG. 3) is limited by the piston area and the available pressure differential relative to atmospheric, the stiffness of the piston return-spring 223, the stiffness of drive arm region 275, and drive arm length 277 must be chosen to provide repeatable strip widths in the resulting integral hologram.

Referring to FIG. 2, anti-rise block 130 is provided to resist upward movement of film 300 in the region of drive arm 207. Surface 133 of anti-rise block 130 is preferably located 0.002" above the top edge of film 300. After loading the transport, the weight of film in supply drum 100 is typically much greater than the initial weight of film in take-up drum 101. Due to the forces involved, there may be an initial slight tendency for the film beyond drive arm 207 to rise vertically as successive increments or film are advanced. The maximum vertical distance the film can travel vertically above 310 in this instance is limited to 0.002" as defined by the relationship of surface 133 to base plate surface 310. The film will not bind as with fixed drive roller devices, since the drive arm releases the film following each incremental step. Subsequently, sufficient weight on the take-up side of drive arm 207 forces the film back to surface 310. Once on surface 310, the film will remain on that surface for the remainder of the recording process. Thus, drive arm release coupled with resistance of anti-rise block 130 compensates for any slight tendency for film to rise in the transport. In practice film rise can be eliminated totally by feeding a leader approximately six inches in length beyond drive arm 207.

The method of loading film in the transport will now be described: Referring to FIGS. 1–2, anti-rise block 130 is first retracted by loosening anti-rise screw 132 and moving 130 in direction 139 until surface 134 is positioned at location 138. In this position the front surface of 130 is behind exposure stage 125. Holographic film 300 of the required length for the integral hologram is loosely coiled along its natural curve and inserted in drum 100. The leading edge of the film is then pulled from drum 100 and positioned against the rear of film guides 106 and 107 (FIG. 1). Using slight finger pressure, the film is entered into channels 109 and fed until resistance is felt. Resistance indicates that the lower front edge of film 300 has passed into drive block assembly 204 and has contacted drive arm 207 (FIG. 5).

Film 300 is then lifted until the top edge of the film contacts the underside of top film guide 106 (FIG. 2). The gap 111 provided for top film guide 106 (FIG. 2) allows the film to be moved over the foot 271 of drive arm 207 while still remaining in channel 282 of the drive block assembly, and channel 109 of lower film guide 107. With the top of film 300 in contact with the underside of top film guide 106, additional film is fed from the supply drum until the leading edge of film 300 is positioned within drum 101 past edge 181. Drive arm 207 is then engaged by exerting slight downward force on the top of the film over drive block assembly 204. Finally, anti-rise block 130 is located at its operating position by moving block 130 forward until surface 134 is at location 129. Anti-rise screw 132 is then lightly tightened (FIG. 1).

The method of adjusting the width of the strip holograms is described as follows: With vacuum ferrule 230 at atmospheric, micrometer 220 is first zeroed by turning micrometer knob 221 until stop rod 223 contacts surface 269 in the annular region of piston 205 (FIG. 3). The strip width is then set by turning knob 221 in the opposite direction for the number of vernier graduations corresponding to the desired strip width.

Figure 8:
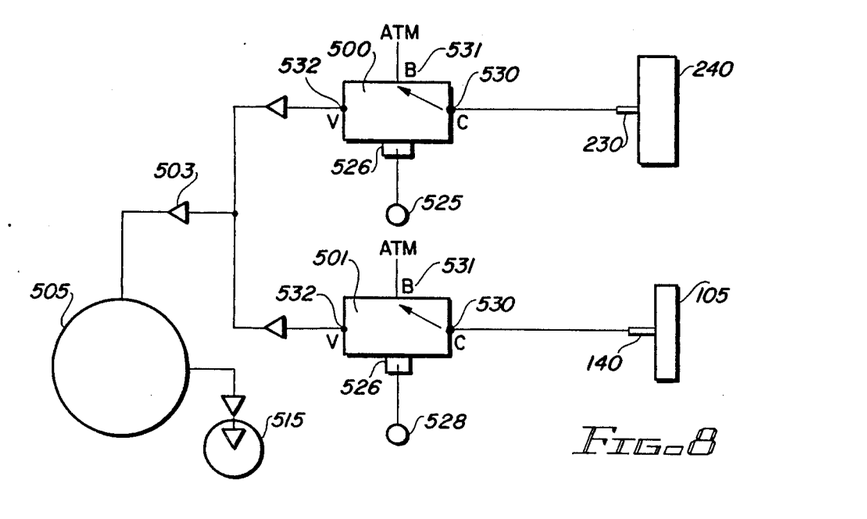
FIG. 8 is a schematic drawing of the vacuum system to operate the film stepping mechanism and vacuum-platen in FIG. 1.

The apparatus of FIG. 1 is powered by vacuum assembly 540 shown in FIG. 8. The vacuum assembly consists of vacuum valves 500 and 501, vacuum reservoir 505 and vacuum pump 515. Valves 500 and 501 are each three-way electrically-actuated vacuum valves, consisting of a common port 530, a bleed port 531, vacuum port 532, and electrical connector 526.

Vacuum valve 500 supplies film stepping mechanism 240 via ferrule 230; vacuum valve 501 supplies vacuum platen 105 via ferrule 140. Vacuum pump 515 is a conventional 110 VAC continuous-duty centrifugal pump capable of a maximum vacuum of 24" Hg. Vacuum reservoir 505 has a minimum preferred capacity of 500 cubic inches and serves as a stable supply for the system.

Flow in the system is depicted in FIG. 8 with arrows 503. In the non-actuated state, common ports 530 of valves 500 and 501 are bled to atmospheric; in the actuated state, common ports 530 are connected to vacuum ports 532, which supply 240 and 105 with vacuum. In the system in FIG. 8, pump 515 runs continuously during recording of the integral hologram. Film is incrementally advanced by powering valve 500, while leaving valve 501 in its normally bled condition. To prepare for the next incremental film step, valve 501 is actuated, followed by removal of power to valve 500. The sequencing of valve 500 and valve 501 actuations is preferably under computer control as is shown by 525 and 528 in FIG. 8. Although not shown in FIG. 8, an alternative to constant operation of vacuum pump 515 is to provide a simple electrical circuit and two vacuum switches to keep vacuum in reservoir 505 between two set operating levels.

Figure 9:
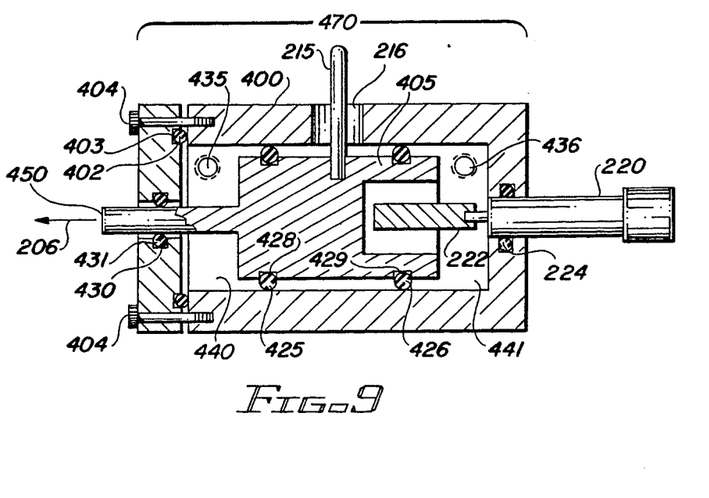
FIG. 9 is a front sectional view of the second embodiment of the piston-cylinder assembly for moving the drive block assembly in FIG. 6 by fluid pressure or vacuum.

A second embodiment of the piston-cylinder assembly is shown in FIG. 9. In this figure an assembly, 470, designed to operate drive block assembly 204 by either fluid pressure or vacuum is shown. Double-acting cylinder 400 has threaded inlet ports 435 and 436 for feeding regions 440 and 441 as shown. Cylinder front plate 401 has a bored opening with axis concentric to the axis or the cylinder, O-ring groove 402 for receiving O-ring 403, and screws 404 for attaching plate 401 to cylinder 400. Piston 405 has O-ring grooves 428, 429 and 430, for receiving O-rings 425, 426, and 431, respectively.

Similar to the first embodiment of the piston-cylinder assembly, piston 405 is counter-bored to receive stop rod 222. In this embodiment, however, no return spring (223, FIG. 3) is needed. O-rings 403, 431, and 425 seal region 440 in cylinder 400. O-rings 426 and 224 seal region 441 in cylinder 400. Piston end 450 is attached to drive block 206 at 219 in FIG. 3. To advance the drive block in direction 250, pressurized fluid or vacuum is supplied to port 435 while port 436 is vented. To return the drive block to stop block 210 (FIG. 3), pressurized fluid or vacuum is supplied to port 436, while port 435 is vented.

Figure 10:
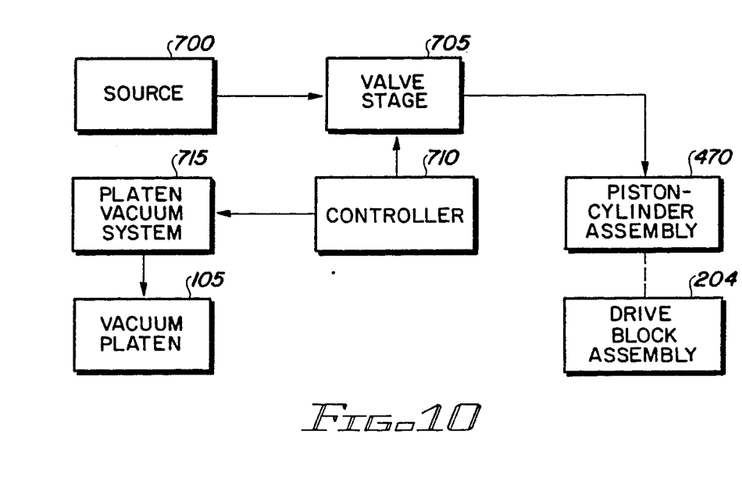
FIG. 10 is a block diagram of a system for driving the piston-cylinder assembly of FIG. 9 and powering the vacuum platen of FIG. 4.

FIG. 10 shows a block diagram of a system for driving both the piston-cylinder assembly of the second embodiment and the vacuum platen. Source 700 can be either a pressurized fluid system (e.g. pneumatic or hydraulic) or a vacuum system, depending upon whether piston-cylinder assembly 470 is driven by a pressurized fluid or vacuum. Controller 710 controls valve stage 705 and platen vacuum system 715. Valve stage 705 supplies pressurized fluid or vacuum to piston-cylinder assembly 470 which is mechanically coupled to drive block assembly 204. Platen vacuum system 715 supplies vacuum to platen 105 (FIG. 1).

A prototype of the preferred embodiment (FIG. 1) has been made and extensively tested in an otherwise vibrationally stable integral holography setup. The prototype consistently yielded integral holograms with no detectible modulation differences between the individual strip holograms. Integral holograms were made with strip widths ranging from 0.005" to 0.030", and yielded repeatable, equally-spaced strip widths as determined by visual examination of the resulting integral holograms.

The exposure stage and transport mechanism of the present invention is particularly adapted for recording and advancing holographic film of continuous length in integral holographic applications, and presents a number of benefits in such applications which result in superior integral holograms. The exposure stage is vibrationally stable and the transport mechanism does not subject the film to strain. These two features in combination insure that the plurality of resulting strip holograms will each have essentially the same modulation. Moreover, the transport mechanism yields identical and repeatable strip widths in the resulting integral hologram, thus avoiding image distortion in the final integral hologram which would otherwise be introduced by variations in strip hologram width.

The invention also permits the strip width for a given integral hologram to be adjustable so that the desired stereoscopic depth effect can be obtained, consistent with the degree or perspective change in the successive two dimensional transparencies. The preset strip widths can be adjusted as short as 0.005" without film backlash, thus allowing flexibility in the rate the two dimensional transparencies are recorded prior to making the integral hologram, and also allowing a wide variation in hypo-hyper stereoscopic effects to be attained.

Finally, the film transport of this invention insures that the holographic film will not bind in the transport mechanism by compensating for any tendency of the film to ride upward during film advance movement. The anti-rise block of the invention makes it unnecessary to employ a lengthy leader to counteract the slight tendency of film to rise vertically in the transport. Visual examination of holograms made with short leaders showed no detectible differences from those made with long leaders.

To those skilled in the holographic and film transport arts, modifications to the embodiments of the invention can be made without deviating from the scope of our invention.

Among these, a laser viewable integral hologram can be recorded by interposing a masking slit in close proximity to the holographic exposure station and by making suitable modifications to the holographic apparatus upstream of the exposure station and transport mechanism of this invention.

The exposure station of this invention can be modified to allow recording of reflection integral holograms. In this modification, region 125 of vacuum platen 105 would be milled out, allowing a reference beam to impinge on the holographic film at an inclined angle from the rear of the transport. To reduce the potential for demodulation, an AR coated optical quality glass plate could be embedded in 105 with its front surface coincident with the surface 117 of vacuum platen 105.

The drive block assembly of the present invention can alternately be driven by motor means, for instance conventional stepper motor, linear actuators, and the like.

Finally, to those versed in the motion picture arts, it should be apparent that the exposure station and film transport or our invention are applicable to other step-and-repeat film exposure and transport problems involving large format films and not limited strictly to holographic film applications.

Although there have been shown and described hereinabove specific arrangements of a holographic exposure station and film transport in accordance with the invention for the purpose or illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the annexed claims.

What is claimed is:

1. An exposure station and film transport assembly for use in recording a plurality of sequential strip holograms on continuous length of non-perforated film in a holographic apparatus, and for moving said film in pre-specified incremental steps between the recording of each strip hologram so as to form an integral hologram, while imparting minimal strain to the film throughout the recording and transport process, comprising:

a. a vacuum platen mechanism with vacuum-recess means to constrain the film in stable, flat and non-distorted manner during holographic recording of each strip hologram, film guide means to guide the film through said vacuum platen mechanism, an anti-rise plate for resisting upward movement of the film during transport, and first vacuum feedthrough means for coupling said vacuum platen mechanism to a vacuum source;

b. a film stepping mechanism operatively coupled to the vacuum platen mechanism for gripping an edge of the film, advancing the film by an incremental step, subsequently releasing the edge of the film while simultaneously re-setting said film stepping mechanism for recording of the next sequential strip hologram, said incremental step having essentially no backlash, c. a supply drum to contain the film in its pre-exposed state without imparting strain to the film;

d. a take-up drum to contain the film in its post-exposed state without imparting strain to the film;

e. a base plate for mounting the vacuum platen mechanism, the film stepping mechanism, the supply drum and the take-up drum, which additionally provides a substantially flat surface for the base of the film to ride during transport; and f. a vacuum system for providing vacuum in a predetermined programmed sequence to the vacuum platen mechanism for firstly stabilizing the film during exposure of each strip hologram, for secondly releasing the vacuum to the vacuum platen mechanism and subsequently applying vacuum to the film stepping mechanism for advancing the film, and for thirdly releasing vacuum to the film stepping mechanism while maintaining vacuum to the vacuum platen mechanism, thus restraining the film and thereby allowing the film stepping mechanism to reset without backward movement of film.

2. The apparatus of claim 1 wherein said vacuum platen mechanism further comprises:
  a. a platen with means defining a rectangular holographic exposure station on the front face of the platen where individual strip holograms are to be recorded;
  b. a first support structure attached to the rear face of the platen by first screw means for stabilizing the platen in vertical orientation, wherein the first support structure is mounted transversely to the face of the platen and coincident with the edge of the platen closest to the supply drum;
  c. a second support structure attached to the rear face of the platen by second screw means for stabilizing the platen in vertical orientation, wherein the second support structure is mounted transversely to the face of the platen and coincident with the edge of the platen closest to the take-up drum;
  d. third screw means for rigidly attaching the first support structure to the base plate in a stable manner;
  e. fourth screw means for rigidly attaching the second support structure to the base plate in a stable manner;
  f. means defining a first vertical vacuum recess in the front face of the platen located in proximity to the vertical edge of the recording plane closest to the supply drum for maintaining the film substantially in contact with the recording plane;
  g. means defining a second vertical vacuum recess in the face of the platen located in proximity to the vertical edge of the recording plane closest to the take-up drum for maintaining the film substantially in contact with the recording plane;
  h. a top film guide with fifth screw means to enable attachment to the platen in a plane parallel to the base plate, with means defining a first channel for the top region of the film to travel, where the width of said channel is of the order of 0.005" greater than the thickness of the film, means defining a blocking surface at the top of the first channel to limit the distance the film can be raised above the baseplate, and means defining a first exterior film guide extension for guiding the film into said first channel;
  i. a bottom film guide including a mounting plate for attaching said bottom film guide to the base plate with sixth screw means, the bottom film guide being located in a plane parallel to the platen and separated from the platen so as to form a second channel for the bottom region of the film to travel, the width of said channel being of the order of 0.005" greater than the thickness of the film and equal to the width of the first channel, and means defining a second exterior film guide extension for guiding the film into said second channel;
  j. the anti-rise plate coupled to the side of the second support structure and extending in front of the plane of the top film guide in top view, including a slot for containing seventh screw means, said seventh screw means passing through said slot and coupled to the side of the second support structure, to allow translation and locking of said anti-rise plate along an axis parallel to the surface of the base plate and perpendicular to the face of the platen, with means to locate the underside of said anti-rise plate at a location of the order of 0.002" above the top surface of the film;
  k. means defining a plurality of tapped openings in the platen, vertically oriented and laterally displaced on either side of the holographic recording plane to allow positioning of the top film guide and securing said film guide to the platen with fifth screw means at various heights relative to the surface of the base plate so as to accommodate various widths of film, wherein for a film of given width, the blocking surface in the first channel of the top film guide is located at a position in front view on the order of 0.3" above the top of the film to allow the film to be raised during loading operations; and
  l. a stop plate of a resilient plastic material attached with eighth screw means to the side of the second support structure in proximity of the top surface of the base plate, to act as a stop to limit the travel of the film stepping mechanism in the direction of the supply drum, and to reduce transmission of vibration from the film stepping mechanism to the vacuum platen mechanism.

3. The apparatus of claim 1 wherein said film stepping mechanism comprises:
  a. a mounting block with essentially U-shaped cross-section in top view, means defining an essentially U-shaped region removed from the top of said mounting block, the surface of the depressed region in the mounting block defined as a first mounting surface for a driving arm, the U-shaped surface in front view serving as a second mounting surface for a film contacting plate, and the U-shaped surface in top view serving as a third mounting surface for a top plate;
  b. a driving arm, with thickness in vertical cross-section less than the depth of the first mounting surface in the mounting block, said driving arm comprising an attachment portion, a leg portion, and a foot portion, said attachment portion being rigidly attached to the first mounting surface in the mounting plate with first screw means, said leg portion acting as an equivalent spring for compressing the foot portion against an edge of the film during film advance, said foot portion extending beyond the front face of the mounting block in top view, the purpose of the foot portion operatively coupled to the leg portion being to securely grip the film between said foot portion and the film contacting plate during film advance, and release the film when the mounting block is moved in a direction opposite to the direction of film advancement;
  c. a film contacting plate, essentially rectangular in front view and L-shaped in side cross-section, with overall depth in side view equal to the depth of the mounting block in front view, with the depth of the upper portion of said L-shaped cross-section being equal to the depth of the first mounting surface in the mounting block, and coupled to the second mounting surface with second screw means to provide a film contacting surface and to provide a gap between the front face of the mounting block and the film contacting surface for the film to travel;

d. a top plate coupled to the third mounting surface with third screw means, wherein the front edge of said top plate in top view is coincident with the second mounting surface, thereby defining in top view a third channel between the front edge of the top plate and the opposing face of the front plate, where further, the width of said third channel is equal to the width of the first channel and the second channel, said third channel being provided for the lower portion of the film to travel; and e. means defining an attachment point on the mounting block, located in top view at the midpoint of the right side of said mounting block, for the purpose of coupling said mounting block to the piston in the piston-cylinder assembly.

4. The apparatus of claim 3 wherein said film stepping mechanism further comprises:

a. a cylinder with rectangular cross-section in front view, with means defining a first opening of circular cross-section extending from the front face of the cylinder to a rear internal surface, the side cross-section of the cylinder being U-shaped, to accommodate a piston;

b. means defining a rear second opening in the cylinder of circular cross-section, extending forward from the rear of the cylinder and communicating with the first opening, both first opening and second opening being concentric, for purpose of attaching a micrometer to the cylinder;

c. means defining a tapped third opening on the back side of the cylinder in proximity to the rear of said U-shaped cross-section, for purposes of attaching a cylinder vacuum fitting;

d. means defining a slot opening in the top face of the cylinder, in a plane parallel to the axis of the first opening, for purposes of containing a piston anti-rotation key and for limiting the travel of said piston anti-rotation key;

e. means defining a plurality of attachment points on the cylinder for enabling the cylinder to be rigidly attached to the base plate;

f. a piston with circular cross-section and means defining a piston opening of circular cross-section extending forward from the rear face of the piston to an interior surface of the piston, said piston opening defined in side cross-section as a U-shaped recess, said interior surface to provide an interior contacting surface for a stop rod;

g. means defining a first O-ring groove located in side view on the exterior of the piston and in proximity to the front or the piston, for receiving a first O-ring;

h. means defining a second O-ring groove located in side view on the exterior of the piston and in proximity to the rear or the piston, for receiving a second O-ring;

i. the first O-ring and second O-ring inserted into the first O-ring groove and the second O-ring groove, respectively, to insure that the piston moves concentrically to the axis of the cylinder when said piston is inserted in the cylinder, the further purpose of the second O-ring being to provide a vacuum seal;

j. means defining a blind tapped fourth opening in the piston located in side view between the first O-ring groove and the second O-ring groove for receiving the piston anti-rotation key;

k. means defining a piston extension of circular cross-ssection, coupled in side view to the front face of the piston with first attachment means, the axis of said piston extension being co-axial with the axis of the piston;

l. second attachment means co-axial with the axis of the piston for attaching the front of the piston extension at the first attachment point of the mounting block in the drive device;

m. a micrometer inserted into the second cylinder opening with means to insure vacuum seal, for purposes of adjusting the travel of the piston;

n. a stop rod of circular cross-section with means defining a fifth opening, said fifth opening in side cross-section being defined as U-shaped, for enabling said stop rod to be attached to the shaft of the micrometer, the purpose of the stop rod in conjunction with the micrometer to provide an adjustable stop to limit the travel of the piston in a direction towards the rear of the cylinder and parallel to the axis of the piston, when the cylinder vacuum fitting is subjected to vacuum;

o. a spring of diameter greater than the diameter of the stop rod and diameter less than the diameter of the piston opening, said spring located in the annular region between the stop rod and the piston opening, the purpose of said spring to return the piston in a direction towards the front of the cylinder when vacuum is removed from the cylinder vacuum fitting; and p. a piston anti-rotation key of circular cross-section oriented in a plane perpendicular to the axis of the cylinder, coupled to the blind tapped fourth opening of the piston, and passing through the slot opening in the cylinder, to resist rotation of the piston in a plane perpendicular to the axis of the cylinder.

5. The apparatus of claim 4 wherein said film stepping mechanism further comprises a drive device coupled to the piston-cylinder assembly with said second attachment means on the piston extension, at the attachment point of the mounting block, such that the plane of the top surface of the mounting block is perpendicular to the axis of the piston anti-rotation key, for maintaining the piston-cylinder assembly in proper relationship to the drive device.

6. The apparatus of claim 1 wherein said base plate comprises:

a. means defining a recess which in front cross-section has a base parallel to the surface of said base plate and depth sufficient for the bottom edge of the foot of the drive arm in the drive device to ride slightly below the surface of said baseplate when the cylinder is attached to the base of said recess, wherein in top view the perimeter of said recess is slightly greater than and co-aligned with the perimeter of the film stepping mechanism, and wherein one edge of said recess is coincident with and parallel to the side edge of the platen and the side edge of the second support structure, for the purpose of providing a recessed mounting surface for the cylinder in the film stepping mechanism; and b. means defining a plurality of tapped openings in the bottom of the recess to enable attachment of the cylinder at the corresponding plurality of cylinder attachment points by screw means so that in top view the film contacting surface of the film contacting plate in the drive device is parallel to the plane of the face of the bottom film guide closest to the platen, the side edge of the mounting block in the drive device furthest from the piston is in contact with the stop plate in the vacuum platen mechanism when the stop rod in the piston-cylinder assembly is in contact with the interior contacting surface of the piston, for purposes of aligning the cylinder with the recess in the base plate, so that the film stepping mechanism will be in proper relationship to the vacuum platen mechanism for proper operation of the apparatus.

7. The apparatus of claim 1 wherein said supply drum comprises a drum of circular cross-section in top view with wall thickness sufficient to provide vibrational stability and in top section means defining a slot of width sufficient for the leading edge of the film to be retracted from the drum, said drum in top view being located in proximity to the vacuum platen mechanism such that the interior edge of the slot furthest from the first support structure is aligned with and parallel to the front face of the platen, for the purpose of providing a receptacle for unexposed film.

8. The apparatus of claim 7 wherein said take-up drum comprises a drum of circular cross-section in top view with wall thickness sufficient to provide vibrational stability and in top section means defining a slot of width sufficient for the leading edge of the film to enter the cylinder, said drum in top view being located in proximity to the front of the cylinder in the film stepping mechanism such that the interior edge of the slot closest to the cylinder is in a plane parallel to the face of the platen, and offset from the plane of the platen by a distance sufficient to clear the film stepping mechanism, for the purpose of providing a receptacle for exposed film.

9. The apparatus of claim 1 wherein said film stepping mechanism includes a piston-cylinder assembly, which comprises:

a. a double-acting cylinder with front rectangular cross-section in front view, with means defining a first opening or circular cross-section extending from the front face of the cylinder to a rear internal surface, the side cross-section of the cylinder being U-shaped, to accommodate a piston;

b. means defining a rear second opening of circular cross-section in the cylinder extending forward from the rear of the cylinder and communicating with the first opening, both first opening and second opening being concentric, for purpose of attaching a micrometer to the cylinder;

c. means defining a tapped third opening on the back side of the cylinder in proximity to the front of said U-shaped cross-section, for mounting a first fluid port fitting;

d. means defining a tapped fourth opening on the back side of the cylinder in proximity to the rear of said U-shaped cross-section, for mounting a second fluid port fitting;

e. means defining a slot opening in the top face of the cylinder in a plane parallel to the axis of the first opening, for purposes of containing a piston anti-rotation key and for limiting the travel of said piston anti-rotation key;

f. means defining a plurality of attachment points on the cylinder for enabling the cylinder to be rigidly attached to the base plate;

g. a cylinder front plate of rectangular cross-section in front view, said cross-section identical in size to the front cross-section of the cylinder, with means defining a fifth opening of circular cross-section in said front plate, located on axis with the axis of the first opening in the cylinder to accommodate piston extension of diameter less than the diameter of the piston, means defining a first front plate O-ring groove in said front plate located in side cross-section in a plane perpendicular to the axis of said fifth opening, for receiving a first front plate O-ring, means defining a second front plate O-ring groove located in the face of the front plate opposing the front face of the cylinder and in proximity to the first opening of the cylinder, said second front plate O-ring being concentric with said first opening, for receiving a second front plate O-ring, and with first screw means to enable mounting of the front plate to the cylinder, for sealing the forward section of the cylinder;

h. a piston with circular cross-section and means defining a piston opening of circular cross-section extending forward from the rear face of the piston to an interior surface of the piston, said piston opening defined in side cross-section as a U-shaped recess, said interior surface to provide an interior contacting surface for a stop rod;

i. means defining a first piston O-ring groove located in side view on the exterior of the piston and in proximity to the front of the piston, for receiving a first piston O-ring;

j. means defining a second O-ring groove located in side view on the exterior of the piston and in proximity to the rear of the piston, for receiving a second piston O-ring;

k. means defining a piston extension of circular cross-section, coupled in side view to the front face of the piston with first attachment means, the axis of said piston extension being coaxial with the axis of the piston;

l. second attachment means co-axial with the axis of the piston for attaching the front of the piston extension at the first attachment point of the mounting block in the drive device;

m. means defining a blind tapped sixth opening in the piston located between the first piston O-ring groove and the second piston O-ring groove for receiving the piston anti-rotation key;

n. a micrometer coupled to the second opening of the cylinder with means to insure a seal, for purposes of adjusting the travel of the piston;

o. a stop rod of circular cross-section with means defining a seventh opening, said seventh opening in side cross-section being defined as U-shaped, for enabling said stop rod to be attached to the shaft of the micrometer, the purpose of the stop rod in conjunction with the micrometer being to provide an adjustable stop that limits the travel of the piston in a direction towards the rear of the cylinder and parallel to the axis of the piston;

p. a piston anti-rotation key of circular cross-section oriented in a plane perpendicular to the axis of the cylinder and coupled to the blind tapped sixth opening of the piston, and passing through the slot opening in the cylinder, to resist rotation of the piston in a plane perpendicular to the axis of the cylinder; and q. a first piston O-ring and a second piston O-ring inserted into the first piston O-ring groove and the second piston O-ring groove, respectively, the first front plate O-ring and the second front-plate O-ring inserted in first front plate O-ring groove and second front plate O-ring groove, respectively, to insure that the piston moves concentrically to the axis of the cylinder when said piston is inserted in the cylinder and to seal the opposite ends of the piston against leakage.

10. Film transport apparatus for incrementally moving thin compliant film comprising:
film supply means;
film take-up means;
a step and repeat film stepping mechanism mounted on a base between the film supply means and the film take-up means, said mechanism including slidable film gripping means which is selectively movable between predetermined first and second positions;
means for releasably retaining the film in a position to which it is advanced by said mechanism during return of the gripping means to its first position; and
control means coupled to the stepping mechanism and the retaining means for sequentially releasing the retaining means, advancing the gripping means to its second position, activating the retaining means to hold the film in the advanced position, and returning the gripping means to its first position in preparation for the next cycle of film movement.

11. The apparatus of claim 10 further including a film exposure station situated between the film supply means and the film take-up means.

12. The apparatus of claim 10 wherein the film supply means comprises a generally cylindrical drum for containing rolled film in its pre-exposed state without imparting strain to the film and an elongate slot extending through the wall of the drum to permit removal of the film in a linear fashion from a roll of film therein.

13. The apparatus of claim 12 wherein the film take-up means comprises a generally cylindrical drum for containing rolled film in its exposed state without imparting strain to the film and an elongate slot extending through the wall of the drum to permit film to be fed into the interior of the drum in linear fashion to be rolled therein.

14. The apparatus of claim 13 wherein each of said drums is formed as a plexiglass extruded cylinder with a wall thickness of at least ¼ inch coated with a low-reflectivity black paint and has an open end communicating with said slot through which a roll of film may be passed.

15. The apparatus of claim 10 wherein said mechanism comprises a piston and cylinder combination connected in driving relationship with said gripping means to cause movement thereof between said first and second positions.

16. The apparatus of claim 15 further including a fixed stop block for determining the location of said first position.

17. The apparatus of claim 16 further including means for driving the gripping means to contact the stop block in said first position.

18. The apparatus of claim 17 wherein said driving means comprise a biasing spring positioned to urge the gripping means toward said stop block.

19. The apparatus of claim 18 wherein said mechanism includes means for forcing said piston to overcome the biasing force of said spring and move the gripping means to its second position.

20. The apparatus of claim 19 further including selectively adjustable means for determining the location of said second position.

21. The apparatus of claim 20 wherein said adjustable means comprise a stop rod selectively locatable to limit the travel of said piston and thereby establish the location of said second position.

22. The apparatus of claim 21 wherein said cylinder includes an end wall through which a micrometer extends for adjusting the location of said stop rod within the cylinder, the stop rod having a surface for bearing against the piston and preventing further travel thereof in moving the gripping means toward said second position.

23. The apparatus of claim 22 wherein said piston includes a hollow axial recess in which the biasing spring is mounted and in which the stop rod is generally co-axially positioned.

24. The apparatus of claim 23 wherein said piston and cylinder combination is adapted for vacuum actuation.

25. The apparatus of claim 24 wherein said combination includes a plurality of O-ring seals extending circumferentially about the piston to provide a plurality of sliding sealing surfaces bearing against the interior wall of the cylinder.

26. The apparatus of claim 17 wherein said combination includes a single-acting piston adapted for vacuum activation and further includes a biasing spring for returning the piston to a deactivated position.

27. The apparatus of claim 17 wherein said combination includes a double-acting piston and a pair of chambers on opposite sides of the piston selectively connectable to a vacuum source for alternatively driving the piston and the gripping means to said first and second positions.

28. The apparatus of claim 27 wherein one end wall of said cylinder has a micrometer extending therethrough and coupled to a stop rod for limiting the travel of the piston in one direction.

29. The apparatus of claim 17 wherein said combination includes a double-acting piston and a pair of chambers on opposite sides of the piston selectively connectable to a fluid pressure source for alternatively driving the piston and the gripping means to said first and second positions.

30. The apparatus of claim 29 wherein one end wall of said cylinder has a micrometer extending therethrough and coupled to a stop rod for limiting the travel of the piston in one direction.

31. The apparatus of claim 10 wherein the gripping means comprises a resilient arm mounted to extend a biasing force against a backing surface so as to grip the film between the arm and the backing surface to advance the film during movement of the gripping means in one direction while sliding along the film during movement in an opposite direction.

32. The apparatus of claim 31 wherein said resilient arm includes a foot portion outboard of an intermediate spring portion and having a generally planar contacting surface for bearing against the film.

33. The apparatus of claim 32 wherein the contacting surface is provided with a plurality of surface irregularities to enhance the frictional force between the contacting surface and the film.

34. The apparatus of claim 33 wherein said surface irregularities comprise a plurality of scored indentations on the contacting surface of the foot portion.

35. The apparatus of claim 34 wherein the arm is mounted with the contacting surface of the foot portion being oriented at a predetermined angular displacement relative to the plane of the film against said backing surface.

36. The apparatus of claim 10 wherein said retaining means comprise a vacuum-platen located between the supply reel and the film stepping mechanism.

37. The apparatus of claim 36 wherein the vacuum-platen includes a generally planar surface extending orthogonally from said base for supporting the film, said surface defining a plurality of passages coupled to a vacuum source for retaining the film against said surface when vacuum is applied thereto.

38. The apparatus of claim 37 wherein said passages include a pair of vacuum recesses oriented generally orthogonally to said base, and further including a film exposure station located between said vacuum recesses.

39. The apparatus of claim 38 further including guide means situated along the path of film travel between the slots of said supply means and said take-up means for guiding the film along said path.

40. The apparatus of claim 36 further including a vacuum system coupled to the retaining means and the stepping mechanism for selectively applying vacuum thereto comprising a vacuum source, coupling means for coupling respectively to the vacuum-platen and to the stepping mechanism, and means for alternatively switching the vacuum source to couple with the vacuum-platen and the stepping mechanism.

41. The apparatus of claim 10 wherein said base comprises a generally rectangular base plate supporting a vacuum-platen mounted thereon between said film supply means and said film stepping mechanism, said base plate having a generally planar upper surface supporting film guide means adjacent to said vacuum-platen, said base plate defining a recess in said upper surface, and means mounting said film stepping mechanism within said recess and extending above said upper surface.

42. The apparatus of claim 41 wherein said film guide means is displaced from the vacuum-platen by an amount sufficient to permit the film to advance therethrough, thereby serving to guide the film along one edge as it advances along said base plate surface between the guide means and the vacuum-platen.

43. The apparatus of claim 42 wherein said film gripping means include a support surface generally aligned with the upper surface of the base plate in the region between said takeup means and said vacuum-platen to provide support for the edge of the film as the film is being advanced past the vacuum-platen.

44. The apparatus of claim 41 wherein said guide means further include an upper guide member positioned to guide the upper edge of the film as it traverses the vacuum-platen.

45. The apparatus of claim 44 wherein said upper guide member is removable from said vacuum-platen and further including means for mounting said upper guide member to said vacuum platen at different selected distances from the base plate to accommodate different widths of film.

46. The apparatus of claim 45 further including an anti-rise member positionable along a side face of the vacuum platen adjacent to the upper guide member for preventing the film from skewing as it is being advanced by the stepping mechanism.

47. The apparatus of claim 10 further including a vacuum system coupled to the retaining means for selectively applying vacuum thereto, a pressure system for selectively applying a pressurized fluid to the stepping mechanism, and controller means coupled to control the selective application of said vacuum and said pressurized fluid to actuate the retaining means and the stepping mechanism in a predetermined sequence.

* * * * *